(12) United States Patent
Hasegawa

(10) Patent No.: US 6,782,549 B1
(45) Date of Patent: Aug. 24, 2004

(54) PROGRAMME RETRIEVAL SYSTEM AND METHOD, AND STORAGE IN WHICH PROGRAMME RETRIEVAL PROGRAM IS STORED

(75) Inventor: Takashi Hasegawa, Hachioji (JP)

(73) Assignee: Hitachi, Ltd., Tokyo (JP)

( * ) Notice: Subject to any disclaimer, the term of this patent is extended or adjusted under 35 U.S.C. 154(b) by 715 days.

(21) Appl. No.: 09/616,028

(22) Filed: Jul. 13, 2000

(30) Foreign Application Priority Data

Mar. 17, 2000 (JP) ........................................ 2000-081668

(51) Int. Cl.[7] ........................... G06F 3/00; G06F 13/00; H04N 5/445
(52) U.S. Cl. ........................ 725/38; 725/151; 725/134; 348/731
(58) Field of Search ........................... 725/32, 38, 134, 725/142, 151; 345/723; 348/731; 455/161.2, 166.1; 386/83, 1

(56) References Cited

U.S. PATENT DOCUMENTS

| | | | | |
|---|---|---|---|---|
| 5,421,031 A | * | 5/1995 | De Bey | ........................ 725/92 |
| 5,946,050 A | * | 8/1999 | Wolff | ........................ 348/553 |
| 6,493,877 B1 | * | 12/2002 | Yamazaki et al. | .......... 725/100 |

FOREIGN PATENT DOCUMENTS

| | | |
|---|---|---|
| JP | 5-75555 | 3/1993 |
| JP | 10-285503 | 10/1998 |
| JP | 11-252628 | 9/1999 |

* cited by examiner

Primary Examiner—Victor R. Kostak
Assistant Examiner—Matthew Demicco
(74) Attorney, Agent, or Firm—Mattingly, Stanger & Malur, P.C.

(57) ABSTRACT

A programme retrieval system and method wherein a desired broadcast programme can be retrieved without fail by setting up a proper relationship between a time length of pre-registered video/audio data and a retrieval time period per channel, and a storage medium containing programme retrieval computer program capable of retrieving a desired broadcast programme in the above-mentioned manner. In retrieval of a desired broadcast programme, a channel changeover is performed at a time interval which is less than a time value attained through division of a time length of a key programme part pre-registered by a user (retrieval key) by the number of retrieval object channels, and a determination is formed regarding whether or not a programme particle input at each time interval of changeover is found in the retrieval key.

16 Claims, 10 Drawing Sheets

PROGRAMME RETRIEVAL SYSTEM AND METHOD, AND STORAGE IN WHICH PROGRAMME RETRIEVAL PROGRAM IS STORED

BACKGROUND OF THE INVENTION

The present invention relates to a programme retrieval system and method for retrieving a broadcast programme matching a desired programme, and a storage in which a programme retrieval program executable by a computer is stored.

It has been proposed to provide a video recording system wherein a determination whether or not an input image matches a desired programme to be recorded is formed and wherein video recording is performed for a predetermined period of time if a match is found between the input image and the desired programme, thereby enabling the video recording even if the start time of programme broadcasting is shifted in time (in Japanese Patent Laid-open (Kokai) No. Hei 10-285503, for example). In this video recording system, however, it is required for a user to specify in advance a broadcast channel since only one tuner is provided. Therefore, when a broadcast channel corresponding to the desired programme is unknown, it is not allowed to carry out reserved programme recording.

Furthermore, there is disclosed a video recording method wherein information on a broadcast programme to be transmitted immediately before the start thereof is checked against information pre-registered by a user through broadcast channel changeover on a time-division basis to retrieve a broadcast programme desired to be recorded by the user among programmes on a plurality of broadcast channels (in Japanese Patent Laid-open (Kokai) No. Hei 5-75555, for example).

SUMMARY OF THE INVENTION

According to the latter method mentioned above, under condition that the result of retrieval is successful, the desired programme may be recorded even if a broadcast channel corresponding thereto is unknown. However, in this method, since a retrieval time period is equal to a time length of pre-registered information, a comparison check is not made if transmission of the desired programme to be retrieved is started during a changeover to another broadcast channel. Resultantly, the result of retrieval is unsuccessful in most situations.

In view of the foregoing, it is an object of the present invention to provide a programme retrieval system and method wherein a desired broadcast programme can be retrieved without fail by setting up a proper relationship between a time length of pre-registered video/audio data and a retrieval time period per channel. It is another object of the present invention to provide a storage storing a programme retrieval computer program capable of retrieving a desired broadcast programme without fail in the manner mentioned above.

In accomplishing these objects of the present invention and according to one aspect thereof, a channel changeover is performed at a time interval which is less than a time value attained through division of a time length of a pre-registered key programme part, namely, a key for retrieval (hereinafter referred to as a retrieval key) by the number of retrieval object channels, and a determination is formed regarding whether or not a programme particle input at each time interval of changeover is found in the retrieval key. In this arrangement, since the time length of the retrieval key is longer than the sum of time intervals on all the channels, it is possible to prevent occurrence of unsuccessful retrieval.

In retrieval operation, programme particles are checked successively against a retrieval key in a time-shifted sequence from the beginning of the retrieval key. If a match is found anywhere in the retrieval key, it is determined that retrieval is to be made. A determination to be formed with respect to a time length of the retrieval key is completed before a changeover to the next channel.

In a situation where a retrieval object programme starts during the above-stated time interval so that a time length of the retrieval object programme becomes shorter than the above-stated time interval, a determination time may be shortened to cause incomplete retrieval. In this case, retrieval is ensured under condition that the retrieval object programme is continued to be applicable to the above-stated time interval when the channel concerned is selected again after a changeover cycle. That is, it is desirable to provide a time interval which is less than a time value attained through division of a time length of a retrieval key by "the number of channels + 1".

These and other objects, features and advantages of the present invention will become more apparent in view of the following detailed description of the preferred embodiments in conjunction with accompanying drawings.

DETAILED DESCRIPTION OF THE PREFERRED EMBODIMENTS

The present invention will now be described in detail by way of example with reference to the accompanying drawings concerning a programme retrieval system and method and a storage in which a programme retrieval program executable by a computer is stored.

Figure 1:
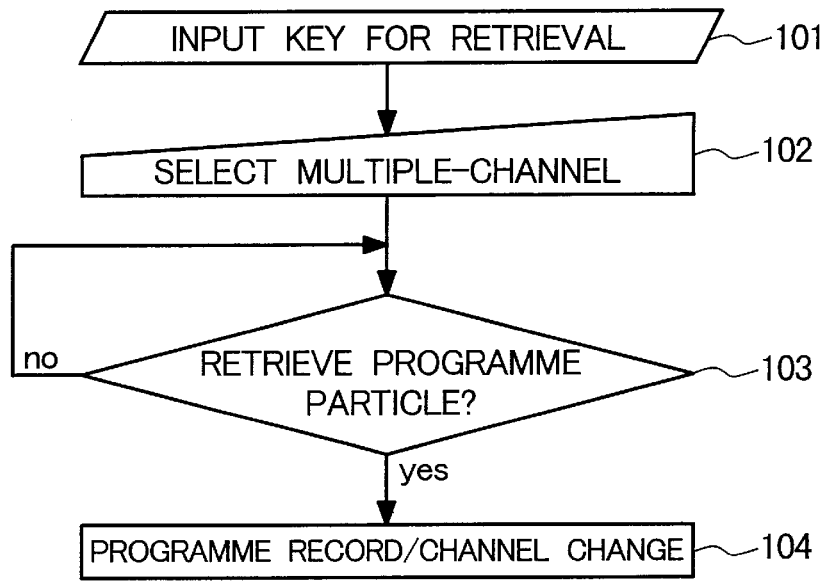
FIG. 1 is a flowchart for explaining a preferred embodiment of a programme retrieval method according to the present invention.

Referring to FIG. 1, there is shown a flowchart of basic operations in a preferred embodiment of the present invention. First, a retrieval key (key for retrieval) which is key data taken out of programme data (audio data or video data) is input (step 101). Then, a plurality of retrieval object channels (multiple channels) are specified (selected) (step 102). For each of the specified channels, it is checked whether a programme particle taken out at a predetermined time interval is found in the retrieval key (step 103). If the programme particle is found in the retrieval key, it is determined that retrieval is to be performed and then a programme stream following the programme particle is recorded. Alternatively, a display video channel changeover (channel change) is performed to display a programme thus retrieved (step 104).

Figure 2:
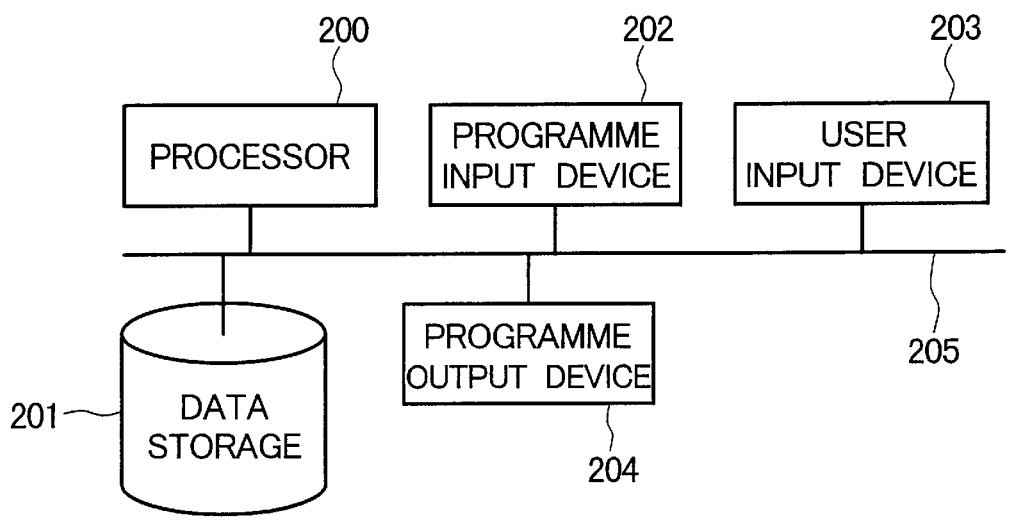
FIG. 2 is a block diagram for explaining a preferred embodiment of a programme retrieval system according to the present invention.

Referring to FIG. 2, there is shown an example of a system configuration in a preferred embodiment of the present invention. In FIG. 2, reference numeral 200 indicates a processor (CPU) for carrying out retrieval processing, reference numeral 201 indicates a data storage for storing programme retrieval computer program, key data, programme particles, retrieved programmes and temporary memory data for execution of the retrieval processing (steps 101 to 104), reference numeral 202 indicates a programme input device for inputting programme data, reference numeral 203 indicates a user input device for specifying a retrieval key, a time length T of the retrieval key (step 101), multiple channels (step 102) and other user control items, reference numeral 204 indicates a programme output device for outputting programme data, and reference numeral 205 indicates a bus line for interconnecting these devices. A computer comprises the processor 200 and the data storage 201.

While the data storage 201 comprises a semiconductor memory and a magnetic disk unit in the present preferred embodiment, any other type of data storage device such as DVD-RAM may be used. Further, in a modified embodiment, there may be provided such an arrangement that different storage devices are used for storing the programme retrieval computer program and programme-related data such as key data separately.

The programme input device 202 is a radio tuner or a television tuner in most applications. Through an antenna or cable, the programme input device 202 receives broadcast waves, selects a specified channel, and feeds programme data of the selected channel to the bus line 205. In the case of digital broadcasting, the programme input device 202 takes in audio or video data as a digital data stream as it is. Contrarily, in the case of analog broadcasting, programme data is converted into digital form for retrieval processing. For this purpose, the programme input device 202 is equipped with an encoder. Further, as will be explained more fully hereinafter, a channel changeover signal is supplied from the processor 200 at the time of retrieval processing, and a channel changeover is carried out accordingly.

The programme output device 204 is a speaker for programme audio data or a television monitor for programme video data. Where a digital broadcast is received or where programme data stored in the data storage 201 is output, digitized programme data is converted into analog signals. For this purpose, the programme output device 204 is equipped with a decoder.

As the user input device 203, a remote controller is used in most applications. In lieu of it, any other type of input device such as a mouse or keyboard may be used. While a retrieval key time length T is specified by the user according to a feature of a desired programme in the present preferred embodiment, there may also be provided such a modified arrangement that a standard time length is preset for a retrieval key.

Figure 8:
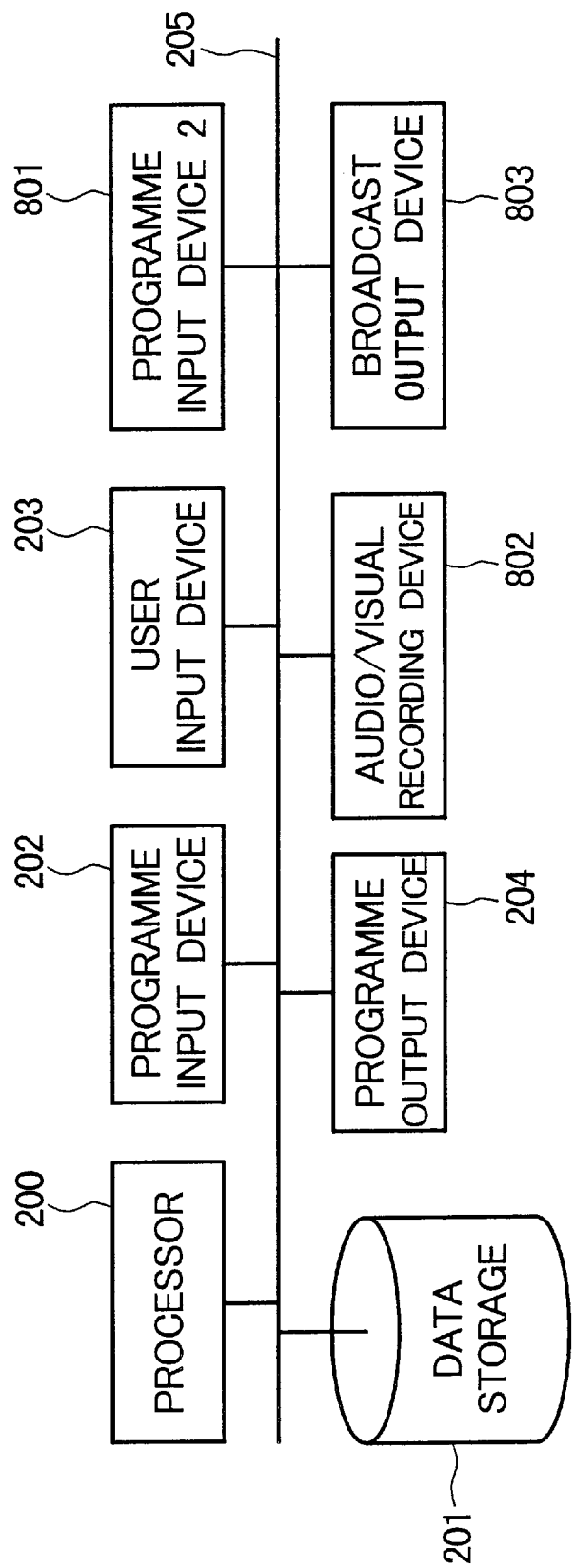
FIG. 8 is a block diagram for explaining another preferred embodiment of a programme retrieval system according to the present invention.

Referring to FIG. 8, there is shown another exemplary embodiment of a system configuration according to the present invention. In this example, at least any one of a programme input device 801, a video/audio recording device 802, and a broadcast output device 803 is added to the system configuration shown in FIG. 2. In most applications, the video/audio recording device 802 is a video deck, MD deck or the like, which is capable of performing digital or analog recording. Further, a programme input device such as a tuner is included in the video/audio recording device 802. In the video/audio recording device 802, which recording channel is to be selected and when recording is to be started and ended are controlled under direction of the processor 200.

The broadcast output device 803 is a television set, a radio set or the like, which allows reception of television/radio broadcast programmes. In the broadcast ouyput device 803, a channel changeover can be controlled under direction of the processor 200.

Figure 9:
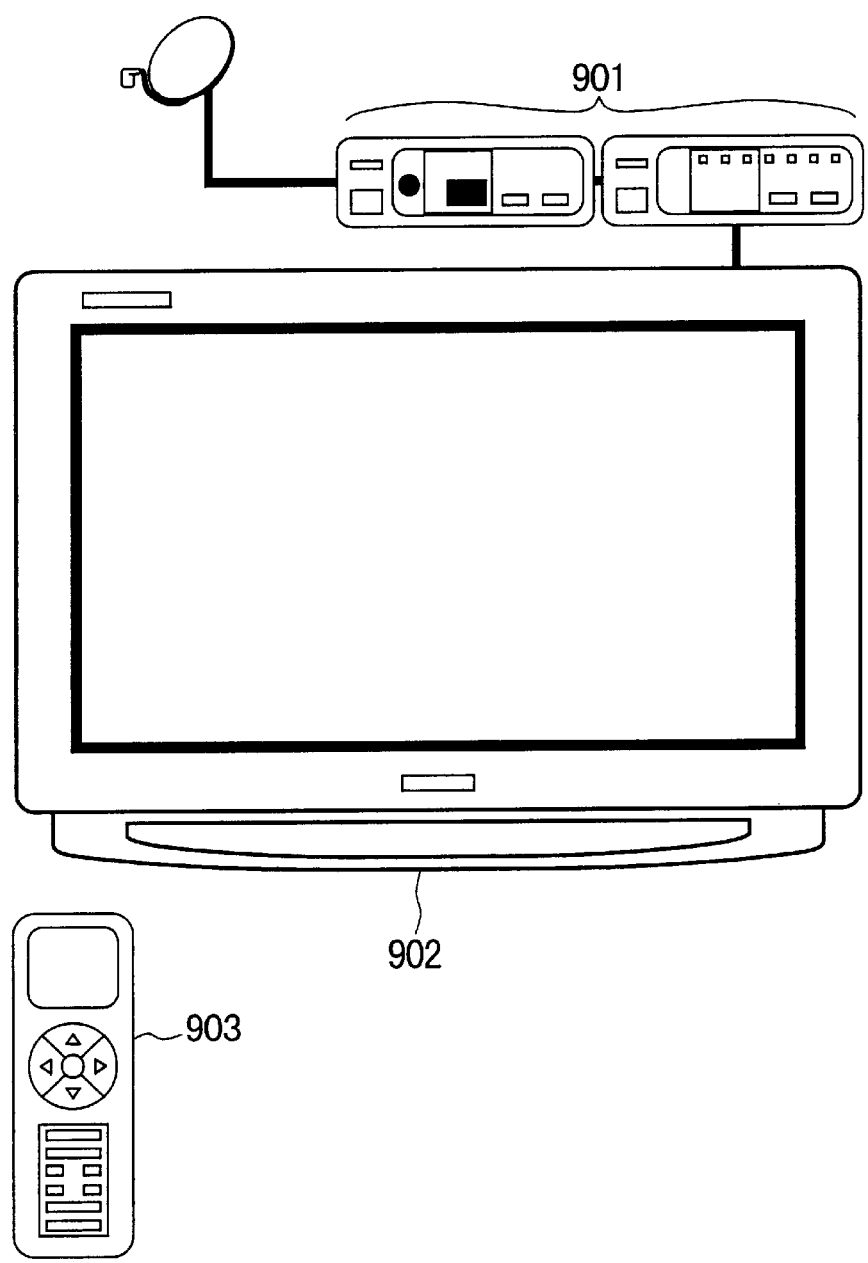
FIG. 9 is a configuration diagram for explaining a set of household electrical appliances including a programme retrieval system according to the present invention.
Figure 10:
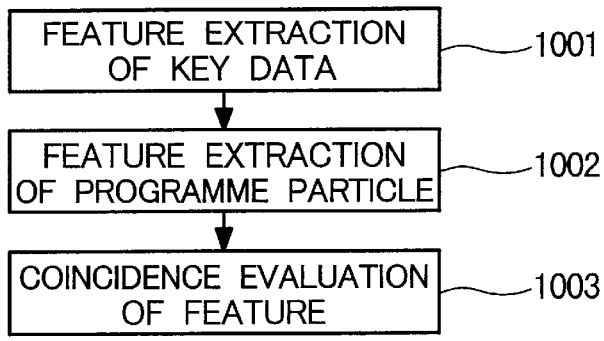
FIG. 10 is a flowchart for explaining a procedure for determining whether or not an input programme particle is found in key data.
Figure 11:
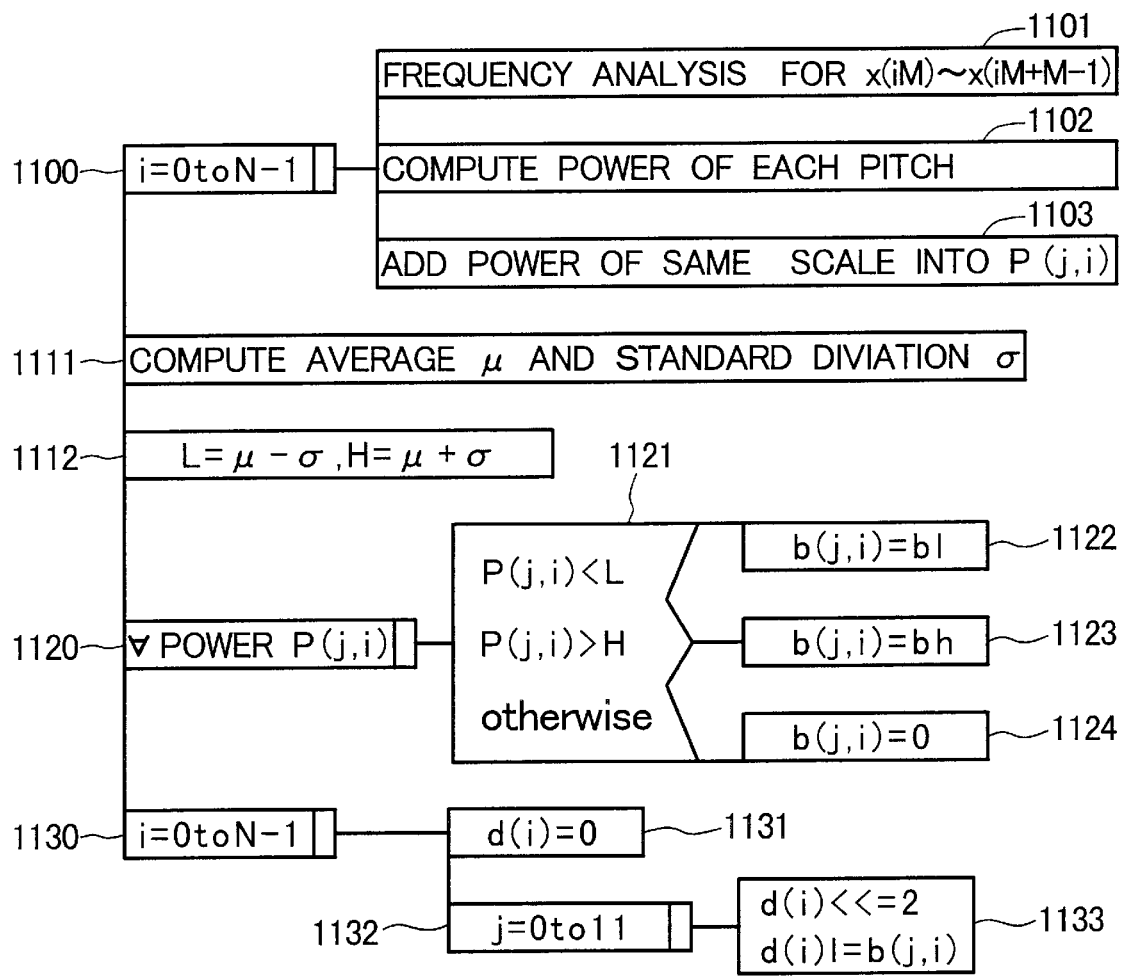
FIG. 11 is a flowchart for explaining a feature extraction procedure in determination of audio data.
Figure 12:
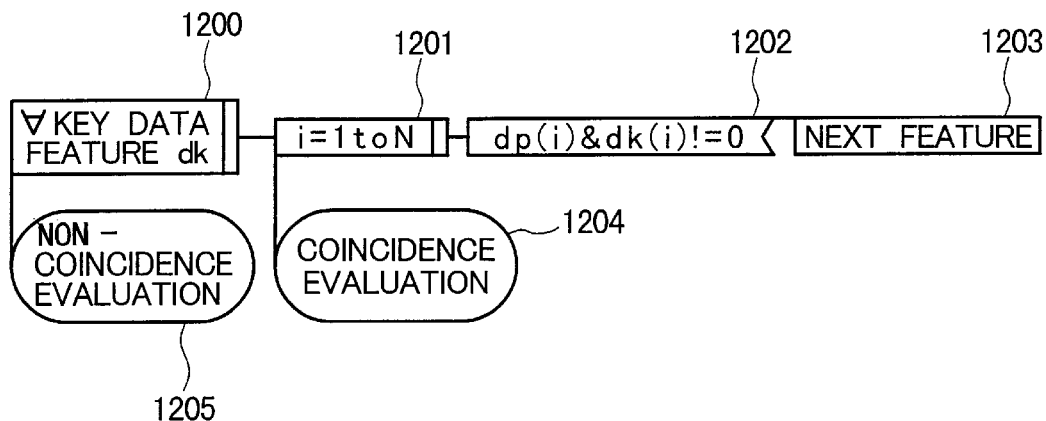
FIG. 12 is a flowchart for explaining a feature coincidence evaluation procedure for audio data.
Figure 13:
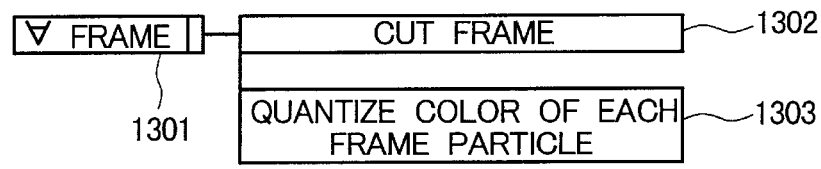
FIG. 13 is a flowchart for explaining a feature extraction procedure in determination of video data.
Figure 14:
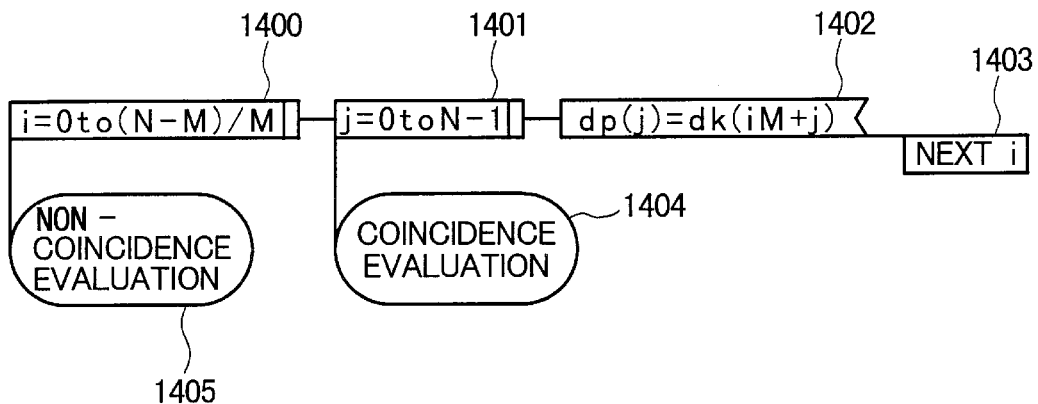
FIG. 14 is a flowchart for explaining a feature coincidence evaluation procedure for video data.

Referring to FIG. 9, there is shown a configuration of household electrical appliances in a preferred embodiment of the present invention. In FIG. 9, reference numeral 901 indicates a set-top box including the processor 200, the data storage 201 and the programme input device 202, reference numeral 902 indicates a television set serving as the programme output device 204, and reference numeral 903 indicates a remote controller serving as the user input device 203. Further, in this exemplary configuration, the programme input device 202 is a television tuner, and the data storage 201 comprises a semiconductor memory and a magnetic disk unit. In a modified arrangement, a television tuner serving as the programme input device 801 may be contained in the television set 902.

Figure 3:
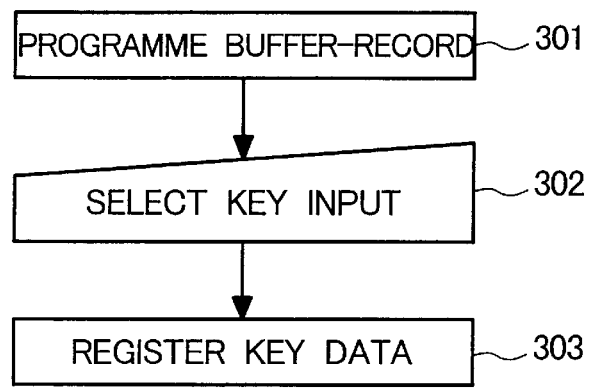
FIG. 3 is a flowchart for explaining an example of a retrieval key input procedure.
Figure 4:
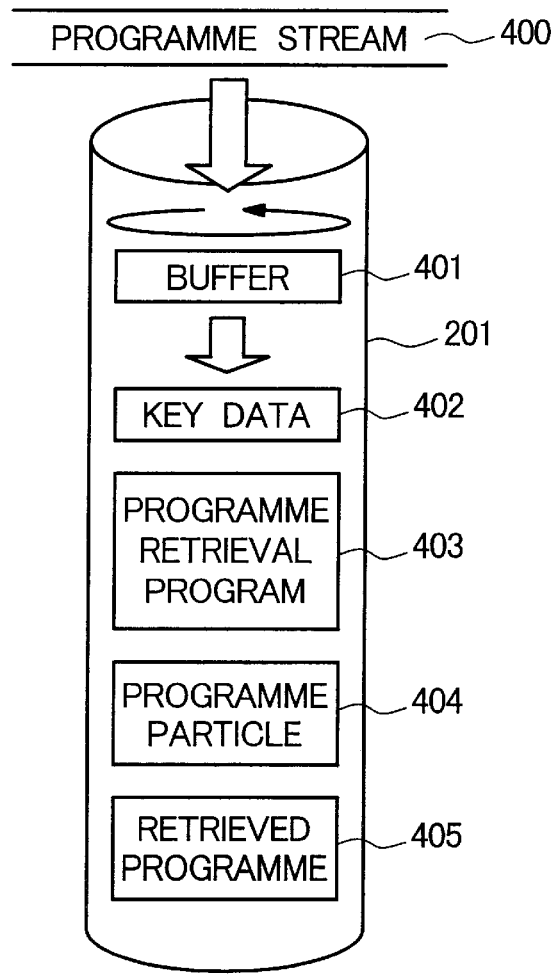
FIG. 4 is a block diagram for explaining an example of a composition of a data storage in connection with a programme data stream at input of a retrieval key.
Figure 5:
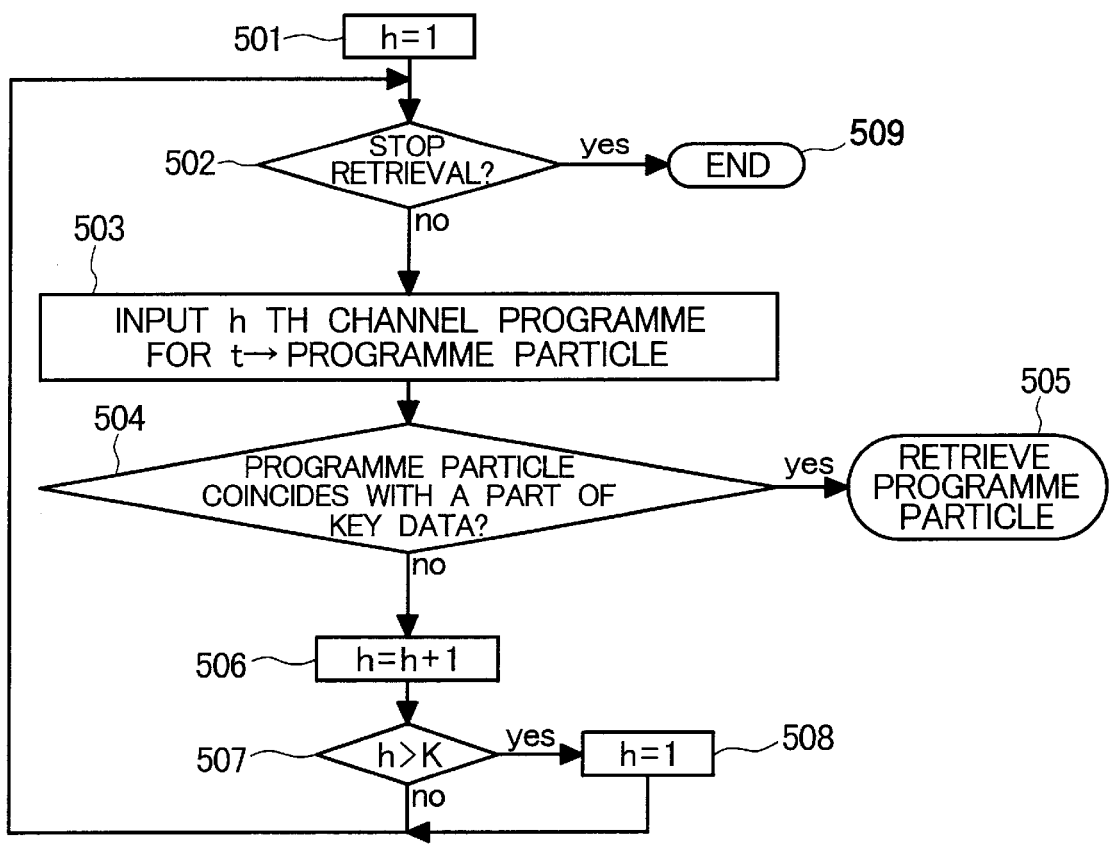
FIG. 5 is a flowchart for explaining an example of a programme particle retrieval procedure.

Then, the following presents a detailed description of retrieval processing to be carried out by the processor 200 shown in FIG. 2 using programme retrieval computer program. With reference to FIGS. 2 to 4, a retrieval key input procedure (step 101) will now be explained below.

In an ordinary situation, broadcast programme data is input through the programme input device 202, and a user views or listens to it on the programme output device 204. In the system configuration shown in FIG. 8, the user may view the programme data on the broadcast output device 803. While the user is watching the programme output device 204, programme data 400 simultaneously fed to the bus line 205 from the programme input device 202 is stored into a buffer memory 401 of the data storage 201 for a predetermined time period T (step 301). When a period of viewing time exceeds the predetermined time period T, new programme data is written over a part of the existing data in the buffer memory 401 of the data storage 201. Thus, programme data for a time period T with respect to the current point of time is always held in the data storage 201. Then, when a desired programme to be retrieved is broadcast, the user selects a key data to be registered through the user input device 203 (step 302). For key data selection, a particular button on a remote controller or a click button of a mouse may be used. Subsequently, programme data for a preceding period T, with respect to a time point when key data registration is specified, until audio output becomes zero, or programme data for a preceding period T with respect to a time point T is registered as key data 402 (step 303). In actual processing, at a time point when key data registration is specified, a part of programme data in the buffer memory 401 is copied to another location in the data storage 201 as the key data 402. In FIG. 4, reference numeral 403 indicates programme retrieval computer program stored in the data storage 201. Reference numerals 404 and 405 indicate a programme particle stored in the data storage 201 and retrieved programme data following the programme particle stored therein, respectively, which will be more fully described later.

In general, the user determines key data while the user is viewing (listening to) a programme part corresponding thereto. Through the above processing, the user is allowed to register key data corresponding to a programme part that the user has viewed (listened to). For example, when the user wants to select key data corresponding to a music programme part to which the user is listening, the user specifies key input (step 302) in the course of an introduction to music. Thus, the user can register key data including the beginning part of the introduction.

Then, the following describes a procedure for specifying a plurality of retrieval object channels using the user input device 203 (step 102). In most applications, on the remote controller 903 (FIG. 9), the user specifies a plurality of retrieval object channels for reservation of video recording. Instead, there may be provided such an arrangement that the user specifies a plurality of retrieval object channels using a keyboard. In this case, through the keyboard, the user enters a channel number or a channel frequency value, followed by a return key. For each channel, the user repeats this input procedure.

Figure 15:
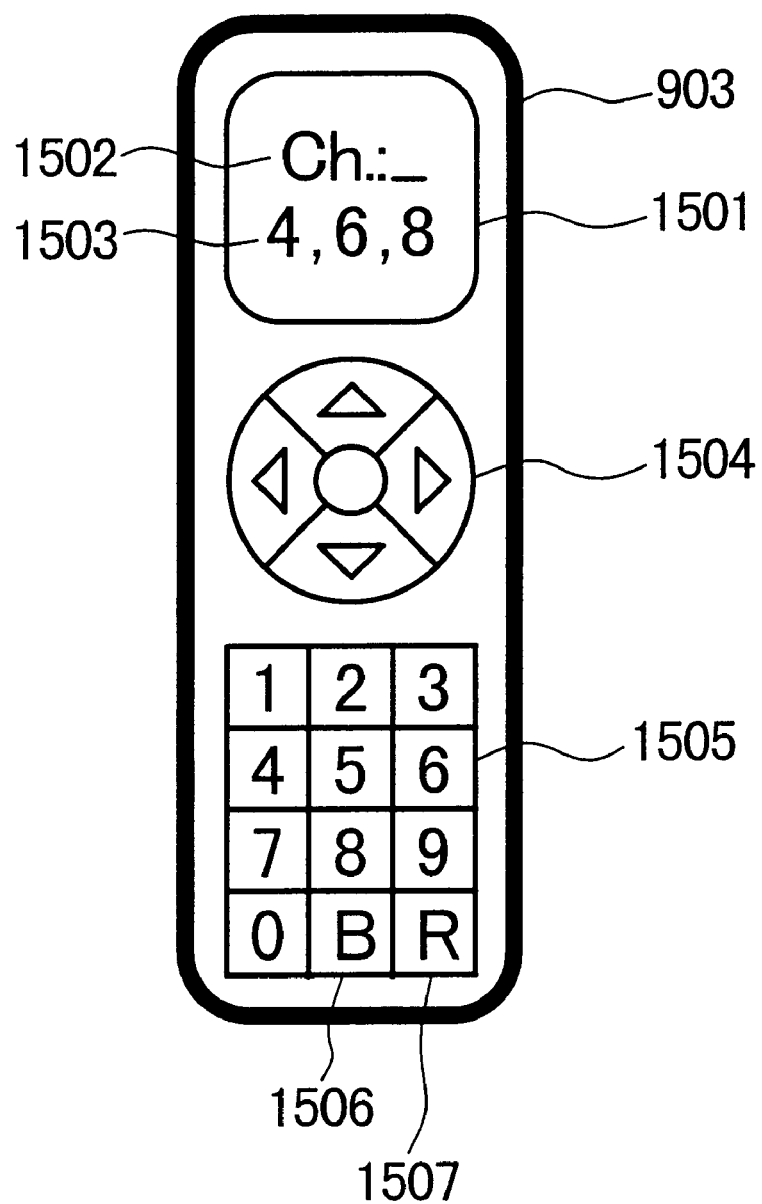
FIG. 15 is a diagram for explaining data input using a remote controller by a user.

Explained below is an example of key data registration and channel specification by the user, with particular reference to FIG. 15. As shown in FIG. 15, the remote controller 903 comprises a display screen 1501, a cursor control button pad 1504, and a numeric key pad 1505.

While the user is receiving a broadcast video/audio programme, the user presses an "R" button 1507. Thus, key data is specified. Then, a channel input prompt 1502 is indicated on the display screen 1501. Using the numeric key pad 1505, the user enters a channel number and presses the "R" button 1507 for specifying it. Each channel number thus specified is indicated in a channel field 1503 located below the channel input prompt 1502. For other desired channels, the user takes the same input procedure. Thus, a plurality of specified channel numbers are indicated in succession. If an error is found during channel number input, the user can delete a channel number immediately preceding the cursor by pressing a "B" button 1506. The user can also delete any channel number from the channel field 1503 by moving the cursor using the cursor control key pad 1504 and pressing the "B" button 1506. Immediately after pressing the "R" button 1507 for channel number specification, the user presses the "R" button 1507 again without performing additional numeric input and cursor movement. Thus, the user can define a plurality of desired retrieval object channels.

Then, with reference to FIG. 2 and FIGS. 5 to 7, the following describes a programme particle retrieval procedure (step 103). It is herein assumed that the number of channels specified in step 102 is "K", and a channel changeover time interval is "t", where "t=T/(K+1)". In some situations, a condition "t≦T/K" may be allowed. Moreover, where "F" programme input devices are available for programme particle retrieval, a condition "t=FT/(K+1)" is provided.

The processor 200 carries out the following processing according to a programme particle retrieval routine in the programme retrieval computer program 403. First, a variable "h" held in the data storage 201 is initialized (step 501).

Then, a determination is formed regarding whether a retrieval stop command has been input from the user input device 203 (step 502). If it has been input, retrieval is terminated (step 509). To issue a retrieval stop command, the user presses a particular button on the remote controller. In a modified arrangement, a mouse click button may be used for this purpose. If the retrieval stop command is not found, the programme input device 202 is set to the "h"th channel among the specified retrieval object channels and programme data of this channel is input for a time period "t". A part of the programme data thus input is stored as the programme particle 404 into the data storage 201 (step 503). Then, a determination is formed regarding whether the programme particle thus stored coincides with a part of the key data 402 which has been input and stored through the retrieval key input procedure (step 101) (step 504). If the programme particle coincides with a part of the key data 402, retrieval of the programme particle is recognized (step 505). Otherwise, the variable "h" is incremented by one (step 506). Then, if the variable "h" becomes larger than "K" (step 507), it is reset to "1"(step 508). Thence, step 502 and the steps subsequent thereto are repeated until the retrieval stop command is input or a programme particle is retrieved.

With reference to FIGS. 10 to 14, the following describes how a determination is formed regarding whether the programme particle 404 coincides with a part of the key data 402 (step 504). First, a feature of the key data 402 is extracted in advance (step 1001). Then, a feature of the programme particle 404 is extracted (step 1002), and a coincidence evaluation is performed on these two features (step 1003).

Explained herein is an example of a feature extraction procedure (steps 1001 and 1002) for audio data evaluation in the present preferred embodiment based on the description in Japanese Patent Application No. Hei 11-252628.

First, the following processing is carried out under condition "variable i=0 to N−1" (step 1100). Then, for audio data "x(iM) to x(iM +M−1)", frequency analysis is performed by such means as FFT (fast Fourier transform) (step 1101), where "M" and "N" are pre-assigned parameters. According to a power level at each frequency thus attained, a power level of each frequency band corresponding to a pitch in music is determined (step 1102).

More specifically, for example, a frequency band power level corresponding to "la" A3 ("la" at 440 Hz) in a musical scale is in a range [$2^{-0.5/24}$ 440 Hz, $2^{0.5/24}$ 440 Hz], i.e., it is the sum of frequency components in a range [427 Hz, 453 Hz]. Then, for each musical scale, addition is performed on power levels (step 1103). For example, as a power level of A ("la"), the sum of power levels corresponding to pitches such as A2, A3, A4 per octave is determined.

Thus, the result of frequency analysis is settled in a range of 12 power levels P(0, i) to P(11, i) corresponding to a dodecaphonic scale. A power level determined through steps 1101 to 1103 can also be attained by applying bandpass filtering to audio data. Since the sum of power levels per octave is determined as mentioned above, there is provided an advantage that original data is retrieved using key data which is shifted up or down on an octave basis with respect to data retained in database (i.e., a doubled or halved frequency).

As a means for determining 12 power levels P(0, i) to P(11, i), it is also practicable to provide the following arrangement: For example, where a power level of A ("la") is determined with respect to audio data "x(iM) to x(iM+M−1)", a bandpass filter for allowing passage of frequencies corresponding to pitches such as A2, A3 and A4 per octave is used to attain an output power therefrom.

Then, as to power levels P(j, i) (j=0 to 11, i=0 to N−1) attained through the above processing, an average value $\mu$ and a standard deviation value $\tau$ are determined (step 1111). According to these values, a power median lower limit L and a power median upper limit H are determined (step 1112). If the power level of interest is not within a range of [L, H], it represents an appreciable feature of audio data.

Then, the following processing is carried out for all the power levels P(j, i) [$\forall$ power levels P(j, I)] (step 1120). If any power level P (j, i) is lower than "L", a feature value b (j, i) is set to "bl" indicating a low level of power (step 1122). If any power level P (j, i) is higher than "H", a feature value b(j, i) is set to "bh" indicating a high level of power (step 1123). In other cases, any power level P(j, i) has a median value, which is set to "0" indicating a non-feature value (step 1124). Each of the above values b (j, i), "bl" and "bh" consists of two bits. In feature data retained in database, "bl" is 1 and "bh" is 2 (bl=1, bh=2). In key feature vector data, "bl" is 2 and "bh" is 1 (bl=2, bh=1). Through interchange of values "bl" and "bh" between database and key data, it becomes possible to carry out a feature coincidence evaluation (step 1003, to be more fully described later) at high speed in bit operation only.

Finally, the following processing is carried out under condition "variable i=0 to N−1"(step 1130). Then, a feature vector d(i) is set to 0 (step 1131). With "j=0 to 11"(step 1132), d(i) is shifted left two bit positions, and the result of OR operation with b(j, i) is assigned thereto (step 1133). In the processing through steps 1131 to 1133, a feature value of each pitch determined in steps 1121 to 1124 is assigned to bits 0 to 24 of d(i) on a basis of two bits. Therefore, d(i) is a 24-bit value, and "N" d(i) values are determined through this processing.

Described below is an example of a feature coincidence evaluation for determination on audio data (step 1003). It is herein assumed that a feature value of a programme particle and a set of "N" consecutive feature values in key data, attained in the feature extraction procedure (steps 1001 and 1002), are dp(i) and dk(i) (i=1 to N), respectively. The following processing is carried out for all the feature values of key data stored as feature data [$\forall$ key data feature value set dk] (step 1200). With "i=1 to N" (step 1201), "dp(i) & dk(i)" is determined (step 1202). If it is not 0, the subsequent processing is not performed but the next feature value in key data is checked (step 1203). If "dp(i) & dk(i)" is 0 for any "i" of "1 to N", a feature coincidence is recognized (step 1204). If no coincidence is found in a set of feature values in key data, a non-coincidence is recognized (step 1205).

The following explains an example of a feature extraction procedure (steps 1001 and 1002) for video data evaluation in the present preferred embodiment based on the description in Japanese Patent Application No. Hei 11-252628.

For all the picture frames ($\forall$ frames) contained in video data, the following processing is carried out (step 1301). First, each frame is divided (cut) into equal particles (step 1302). In most cases, each frame is equally divided into four or nine particles. Then, color data of each divided frame particle is quantized (step 1303). For example, as to RGB (red, green and blue) values of all the points in each frame particle, the sum of G values is normalized with a maximum value of 256 for integer representation. Through this processing, in a case where each frame is equally divided into four parts, a feature value represented by four bytes, i.e., a 32-bit integer is determined for each frame.

Described blow is an example of a feature coincidence evaluation for determination on video data (step 1003). For the sake of simplicity in description in connection with mathematical expressions containing variables and parameters, the same characters as those used in the description concerning audio data such as "i""j", "N", and "M" are also used in the following discussion. Note, however, that these characters represent different variables and parameters. It is herein assumed that the number of frames per programme particle is "M", the number of frames per key data is "N", a feature value of each programme particle is "dp(j)", and a feature value of each key data is "dk(j)". With "i=0 to (N−M)/M" (step 1400), a condition "j=0 to N−1" is given (step 1401). If dp(j) is not equal to dk(iM+j) (step 1402), the processing is performed on the next "i" (step 1403). If an equality is found for every "j", a coincidence is recognized (step 1404). If an equality is not found for every "i", a non-coincidence is recognized (step 1405).

Figure 6:
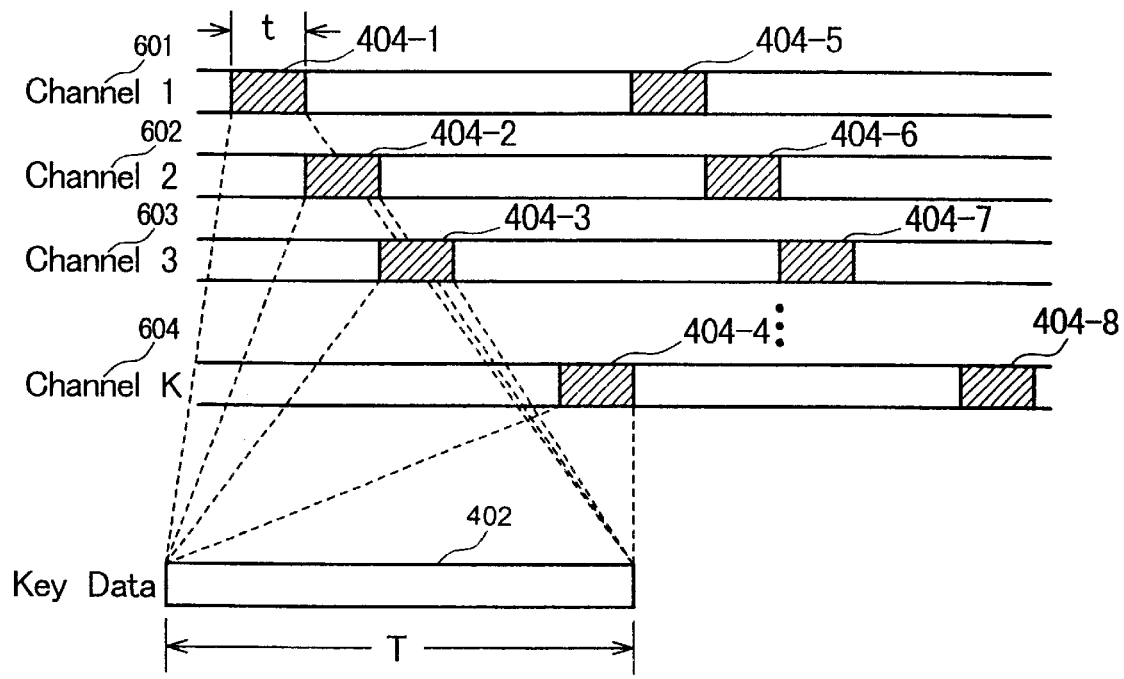
FIG. 6 is a diagram for explaining a relationship between key data and programme particles on a plurality of channels.
Figure 7:
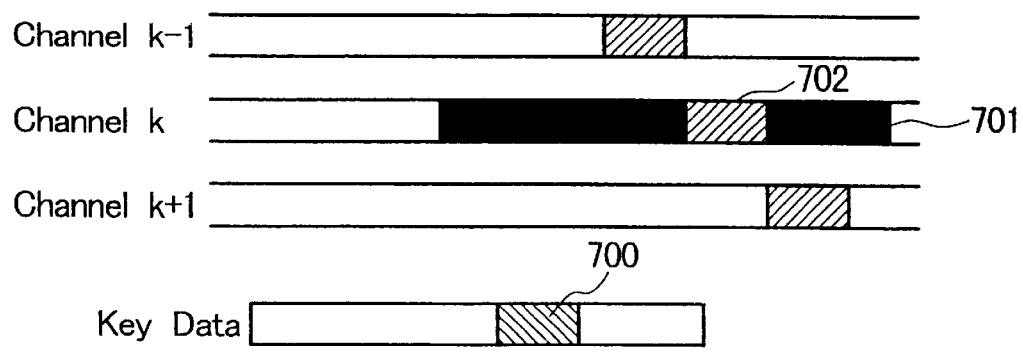
FIG. 7 is a diagram for explaining programme particles to be retrieved properly.

Referring to FIG. 6, there is shown how a programme particle is taken out of broadcast programme data and compared with key data. In FIG. 6, the abscissa represents a period of time, and horizontal bands 601 to 604 indicate programme data on specified channels. Starting from a first channel 601, programme particles 404-1 to 404-8 each having a time length "t" are taken out in succession and compared with key data 402 having a time length "T". As shown in FIG. 7, it is herein assumed that a part 701 having a time length "T" on channel K (solidly shaded) contains data corresponding to any part of the key data 402. The sum of time lengths of programme particles 404-1 to 404-4 on channels 1 to K is less than the time length "T" of the key data 402 [t=T/(K+1)]. Therefore, a programme particle 702 corresponding to the part of interest is input, making it possible to perform a coincidence evaluation on a key data part 700. Thus, retrieval can be carried out properly.

Then, with reference to FIGS. 2 to 8, the following describes a programme record/channel changeover procedure (step 104) indicated in FIG. 1. Upon retrieval of a programme particle 404, either of the following two processing operations is performed.

In a first processing, subsequently to the programme particle 404 which has been input last, programme data is input from the programme input device 202 for a predetermined period of time and stored into the data storage 201 as retrieved programme data 405. Later, the programme data thus stored is reproduced and output from the programme output device 204 (sounding from a speaker, or imaging on a television monitor) Where the video/audio recording device 802 is equipped as shown in FIG. 8, the processor 200 instructs the video/audio recording device 802 to start recording on channel h. Through this processing, the video/audio recording device 802 can automatically record the programme data 405 (audio/video data) starting from a part corresponding to key data 402.

Then, in a second processing, where a programme input device 801 is provided in addition to the programme input device 202 as shown in FIG. 8, while the user is viewing (listening to) another programme output on the programme output device 204 through the programme input device 801, programme data is input through the programme input device 202. Using the programme data thus input, a programme particle retrieval procedure (step 103) is carried out. Upon retrieval, the programme input device 801 is changed over to channel h (step 104). Thus, the user can view (listen to) the programme starting from a part corresponding to key data. Where the broadcast output device 803 is provided in addition to the programme input device 202, while the user is viewing (listening to) another programme output on the broadcast output device 803, programme data is input through the programme input device 202. Using the programme data thus input, the programme particle retrieval procedure (step 103) is carried out. Upon retrieval, the broadcast output device 803 is changed over to channel h (step 104).

Thus, as in the above case, the user can view (listen to) the programme starting from a part corresponding to key data.

Figure 16:
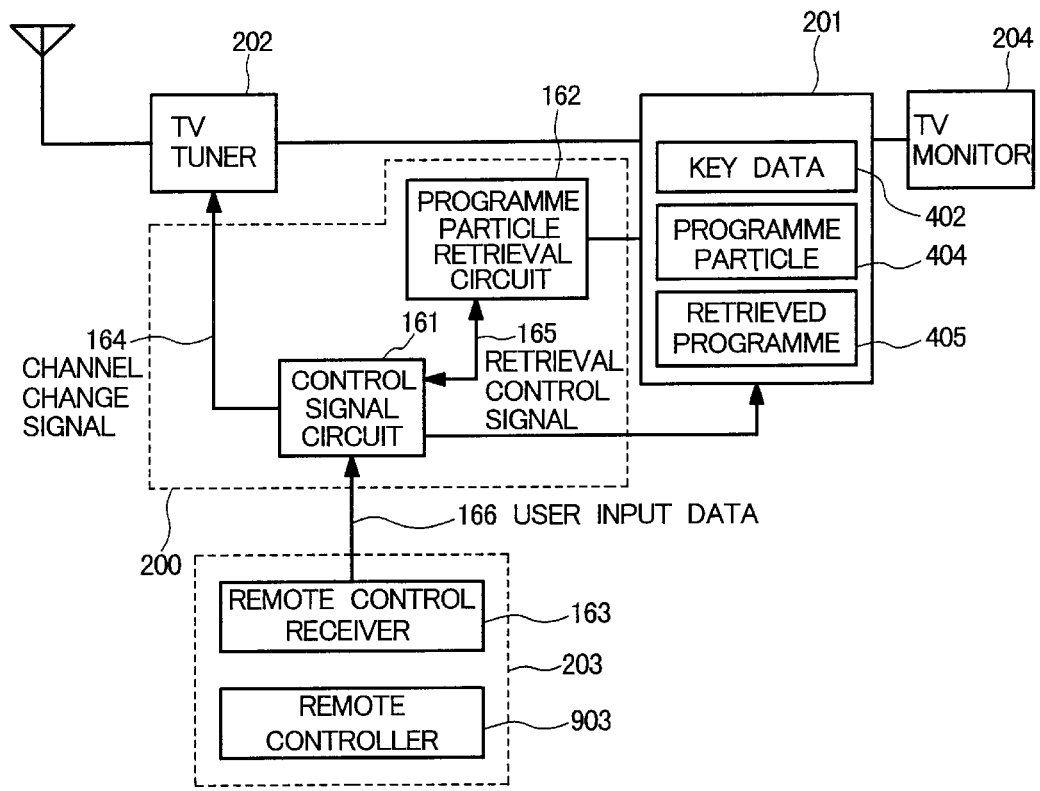
FIG. 16 is a block diagram for explaining functions implemented in a preferred embodiment of a programme retrieval system according to the present invention.

The exemplary system configurations for carrying out the above processing operations are shown in FIGS. 2, 8 and 9. As to a functional circuit configuration for television broadcast reception, the circuit arrangement shown in FIG. 16 is provided to carry out the above-mentioned first processing, for example. In FIG. 16, reference numeral 161 indicates a control signal circuit for generating a channel change signal 164 to the programme input device 202 (television tuner), a retrieval control signal 165 for programme particle retrieval, and a control signal 167 to the data storage 201, reference numeral 162 indicates a programme particle retrieval circuit for performing retrieval processing with input of the key data 402 and programme particle 404, and reference numeral 163 indicates a remote control receiver circuit for receiving data from the remote controller 903 and feeding user input data 166 to the control signal circuit 161. The control signal circuit 161 and the programme particle retrieval circuit 162 are implemented in the processor 200.

Figure 17:
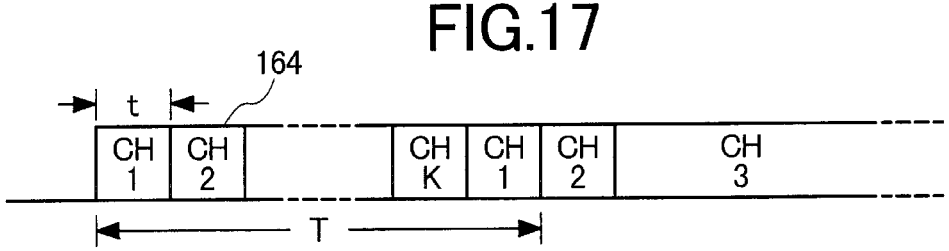
FIG. 17 is a waveform diagram for explaining channel changeover signals.

Referring to FIG. 17, there is shown an exemplary waveform of the channel change signal 164. The channel change signal 164 is provided to perform a changeover among channels (CH) 1 to K at a time interval "t". In this example, as a result of CH3 retrieval, CH3 selection is made continuously even after "t".

Application examples of the above programme retrieval procedure are given below.

First, the user registers an introduction part of music performed by a desired artist as key data. Then, each music performed by the desired artist to be broadcast on a plurality of channels can be recorded. This example is applicable to radio broadcasting and television broadcasting. Further, it is possible to retrieve a television broadcast programme using key data input in radio broadcasting.

For example, a radio broadcast programme is input through the programme input device 202. While the programme buffer recording (step 301) is being performed, the same radio programme is output to the programme output device 204. Under this condition, it is herein assumed that the music performed by the desired artist begins in the radio programme while the user is listening thereto. In this case, the user specifies key input during the introduction part of the desired music (step 302), and thus key data including the beginning of the introduction part can be registered (step 303). Then, the user specifies music-only television channels and general television channels on which music programmes are to be broadcast (step 102). Thereafter, programme particle retrieval is performed for the introduction part of the music of interest on these specified television channels (step 103). Thus, upon retrieval of the music of interest on any of these channels, video data thereof is stored into the data storage 201 (step 104). In this manner, the user can attain video data of the music performed by the desired artist from a plurality of television programmes.

In another application example, the user registers a part of a press interview broadcast in a morning television news programme as key data. Then, video data related to the press interview to be broadcast in afternoon long show programmes on a plurality of channels can be recorded. For example, a morning news television broadcast programme is input through the programme input device 202. While the programme buffer recording (step 301) is being performed, the same television programme is output to the programme output device 204. Under this condition, it is herein assumed that the press interview of interest is broadcast in the television programme while the user is viewing it. In this case, the user specifies key input during broadcasting of the press interview of interest (step 302), and thus key data including the beginning part of the press interview of interest can be registered (step 303). Then, the user specifies general television channels on which long show programmes are to be broadcast (step 102). Thereafter, programme particle retrieval is performed for the press interview of interest on these specified television channels (step 103). Thus, upon retrieval of the press interview of interest on any of these channels, video data thereof is stored into the data storage 201 (step 104). In this manner, the user can attain video data concerning the press interview of interest from a plurality of long show television programmes.

Further, in another application example, the user registers as key data a video scene of a home run by a user's favorite baseball player in a baseball relay broadcasting television programme (sports programme) or a video scene of a bout by a user's favorite Sumo wrestler in a Sumo wrestling relay broadcasting television programme. Then, video data related to the scene of the home run or bout in night sports news programmes on a plurality of channels can be recorded. For example, a sports television broadcast programme is input through the programme input device 202. While the programme buffer recording (step 301) is being performed, the same television programme is output to the programme output device 204. Under this condition, it is herein assumed that the scene of the home run of interest or the Sumo bout of interest is broadcast in the television programme while the user is viewing it. In this case, the user specifies key input during broadcasting of the scene of the home run of interest or the Sumo bout of interest (step 302), and thus key data including the beginning part of the scene of the home run of interest or the Sumo bout of interest can be registered (step 303). Then, the user specifies general television channels on which night sports news programmes are to be broadcast (step 102). Thereafter, programme particle retrieval is performed for the scene of the home run of interest or the Sumo bout of interest on these specified television channels (step 103). Thus, upon retrieval of the scene of the home run of interest or the Sumo bout of interest on any of these channels, video data thereof is stored into the data storage 201 (step 104). In this manner, the user can attain video data concerning the scene of the home run of interest or the Sumo bout of interest from a plurality of night sports news programmes.

As described above, according to the present invention, since a time period of a programme particle used for programme retrieval is less than a time value attained through division of a time length of a pre-registered retrieval key by the number of retrieval object channels, it is possible to retrieve programmes corresponding to the retrieval key on a plurality of channels without fail. After the retrieved programmes are stored, the user can view or listen to any of them as desired. In addition, while the user is viewing or listening to a certain programme, an automatic programme changeover is performed so that the user can view or listen to a programme corresponding to the retrieval key without fail.

While the present invention has been described above in conjunction with the preferred embodiments, one of ordinary skill in the art would be enabled by this disclosure to make various modifications to these embodiments and still be within the scope and spirit of the invention as defined in the appended claims.

What is claimed is:

1. A programme retrieval system comprising:
   receiving means for receiving broadcast programmes, which allows a channel changeover;
   programme selection means for selecting in advance a programme part of a predetermined time length, which is used as a retrieval key, from a programme received by said receiving means;
   channel specifying means for specifying a plurality of retrieval object channels; and
   programme retrieval means for retrieving a programme corresponding to said retrieval key, in which programme particles are received by performing a changeover of said retrieval object channels at a time interval which is less than a time value attained through division of the predetermined time length of said retrieval key by the number of retrieval object channels, and in which a determination is formed regarding whether or not each of the programme particles thus received is found in said retrieval key.

2. A programme retrieval system according to claim 1, wherein said time interval is less than a time value attained through division of the predetermined time length of said retrieval key by (the number of retrieval object channels+1).

3. A programme retrieval system comprising:
   receiving means for simultaneously receiving a plurality of broadcast programmes, which allows a channel changeover;
   programme selection means for selecting in advance a programme part of a predetermined time length, which is used as a retrieval key, from a programme received by said receiving means;
   channel specifying means for specifying a plurality of retrieval object channels; and
   programme retrieval means for retrieving a programme corresponding to said retrieval key, in which programme particles are received by performing a changeover of said object channels at a time interval which is less than a time value attained through division of the predetermined time length of said retrieval key by (the number of retrieval object channels+1/(the number of simultaneously receivable broadcast programmes), and in which a determination is formed regarding whether or not each of the programme particles thus received is found in said retrieval key.

4. A programme retrieval system according to claim 1, further comprising storage means for recording a programme corresponding to said retrieval key upon retrieval therefore by said programme retrieval means.

5. A programme retrieval system according to claim 2, further comprising storage means for recording a programme corresponding to said retrieval key upon retrieval thereof by said programme retrieval means.

6. A programme retrieval system according to claim 3, further comprising storage means for recording a programme corresponding to said retrieval key upon retrieval thereof by said programme retrieval means.

7. A programme retrieval system according to claim 1, further comprising changeover means for changing over from a programme which a user is viewing or listening to to the programme corresponding to said retrieval key retrieved by said programme retrieval means.

8. A programme retrieval system according to claim 2, further comprising changeover means for changing over from a programme which a user is viewing or listening to to the programme corresponding to said retrieval key retrieved by said programme retrieval means.

9. A programme retrieval system according to claim 3, further comprising changeover means for changing over from a programme which a user is viewing or listening to to the programme corresponding to said retrieval key retrieved by said programme retrieval means.

10. A programme retrieval method comprising the steps of:
    selecting in advance a programme part of a predetermined time length, which is used as a retrieval key, from a programme received through a channel changeover;
    specifying a plurality of retrieval object channels;
    receiving programme particles by performing a changeover of said retrieval object channels at a time interval which is less than a time value attained through division of the predetermined time length of said retrieval key by the number of retrieval object channels; and
    retrieving a programme corresponding to said retrieval key by checking whether or not each of the programme particles thus received is found in said retrieval key.

11. A programme retrieval method according to claim 10, wherein said time interval is less than a time value attained through division of the predetermined time length of said retrieval key by (the number of retrieval object channels+1).

12. A programme retrieval method according to claim 10, further comprising the step of recording the retrieved programme corresponding to said detected retrieval key.

13. A programme retrieval method according to claim 11, further comprising the step of recording the retrieved programme corresponding to said detected retrieval key.

14. A programme retrieval method according to claim 10, further comprising the step of changing over from a programme which a user is viewing or listening to to the retrieved programme corresponding to said retrieval key.

15. A programme retrieval method according to claim 11, further comprising the step of changing over from a programme which a user is viewing or listening to to the retrieved programme corresponding to said retrieval key.

16. A storage in which a programme retrieval program is stored, the programme retrieval program executable by a computer for causing the computer to perform the steps of:
    selecting in advance a programme part of a predetermined time length, which is used as a retrieval key, from a programme received through a channel changeover;
    specifying a plurality of retrieval object channels;
    receiving programme particles by performing a changeover of said retrieval object channels at a time interval which is less than a time value attained through division of the predetermined time length of said retrieval key by the number of retrieval object channels; and
    retrieving a programme corresponding to said retrieval key by checking whether or not each of the programme particles thus received is found in said retrieval key.

* * * * *